Figure 1:
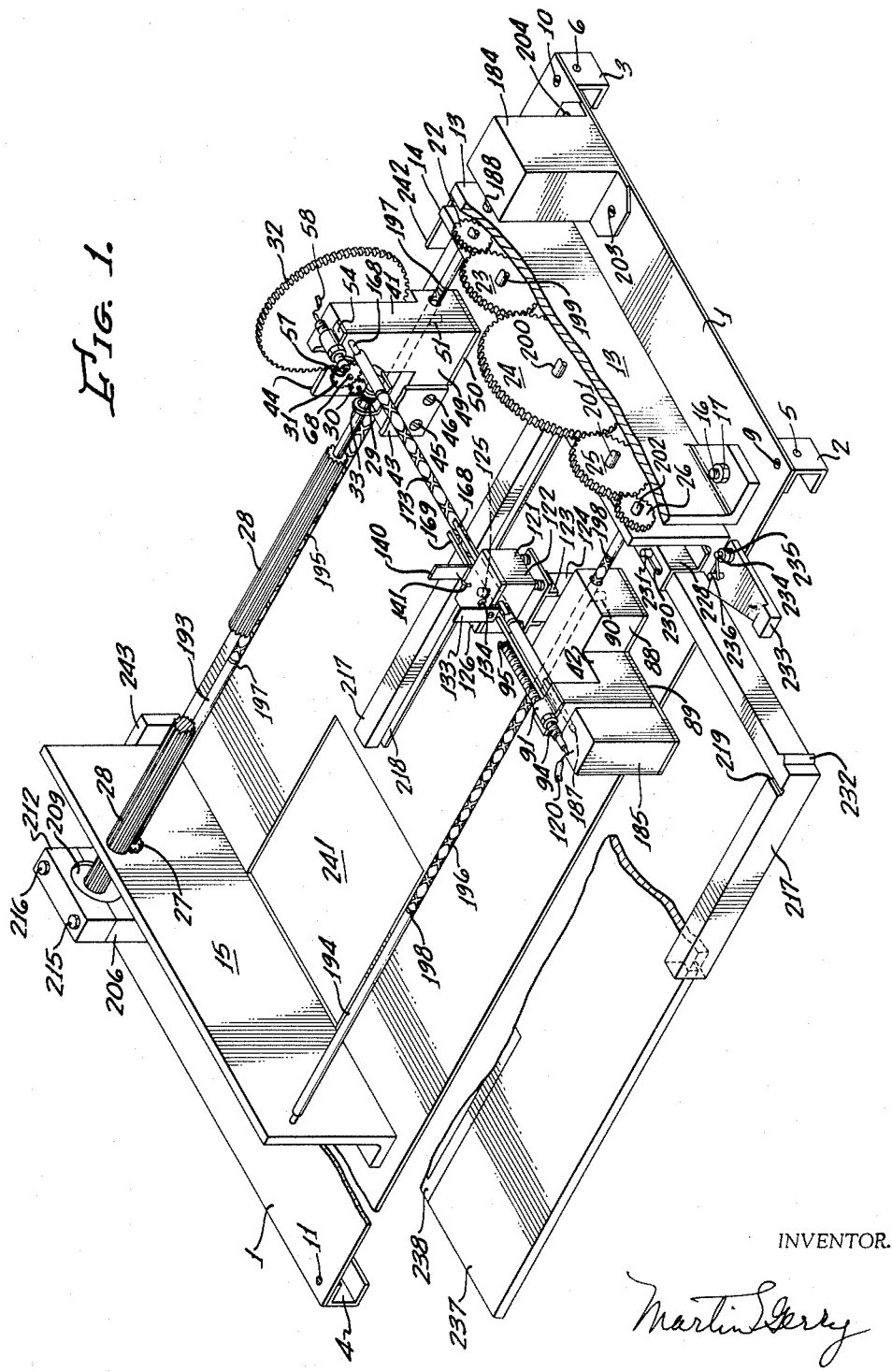

May 17, 1966  M. E. GERRY  3,251,263
SOUND SYNCHRONIZED SLIDE PROJECTOR
Filed March 6, 1963  12 Sheets-Sheet 1

INVENTOR.
Martin Gerry

May 17, 1966　　　　　M. E. GERRY　　　　　3,251,263
SOUND SYNCHRONIZED SLIDE PROJECTOR

Filed March 6, 1963　　　　　　　　　　　12 Sheets-Sheet 2

INVENTOR.
Martin E. Gerry

May 17, 1966  M. E. GERRY  3,251,263
SOUND SYNCHRONIZED SLIDE PROJECTOR
Filed March 6, 1963  12 Sheets-Sheet 3

INVENTOR.
Martin E. Gerry

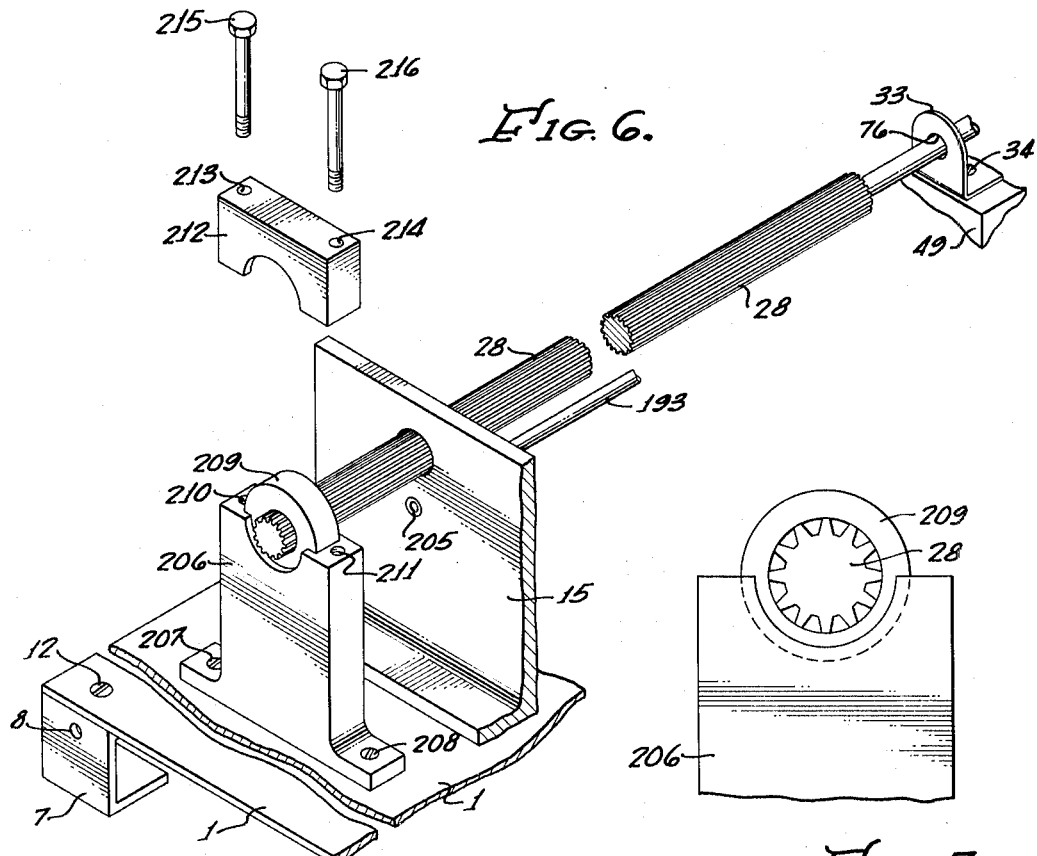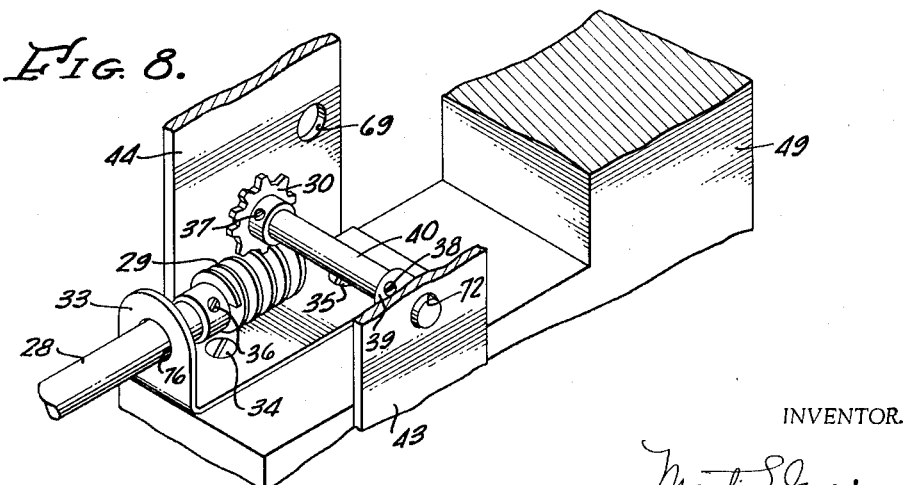

INVENTOR.
Martin Gerry

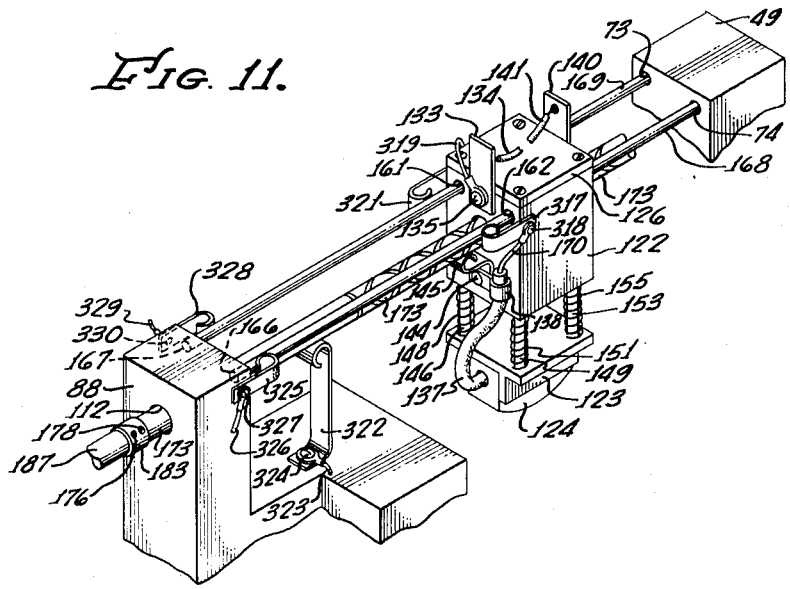

INVENTOR.
Martin E Gerry

May 17, 1966  M. E. GERRY  3,251,263

SOUND SYNCHRONIZED SLIDE PROJECTOR

Filed March 6, 1963  12 Sheets-Sheet 8

INVENTOR.
Martin E Gerry

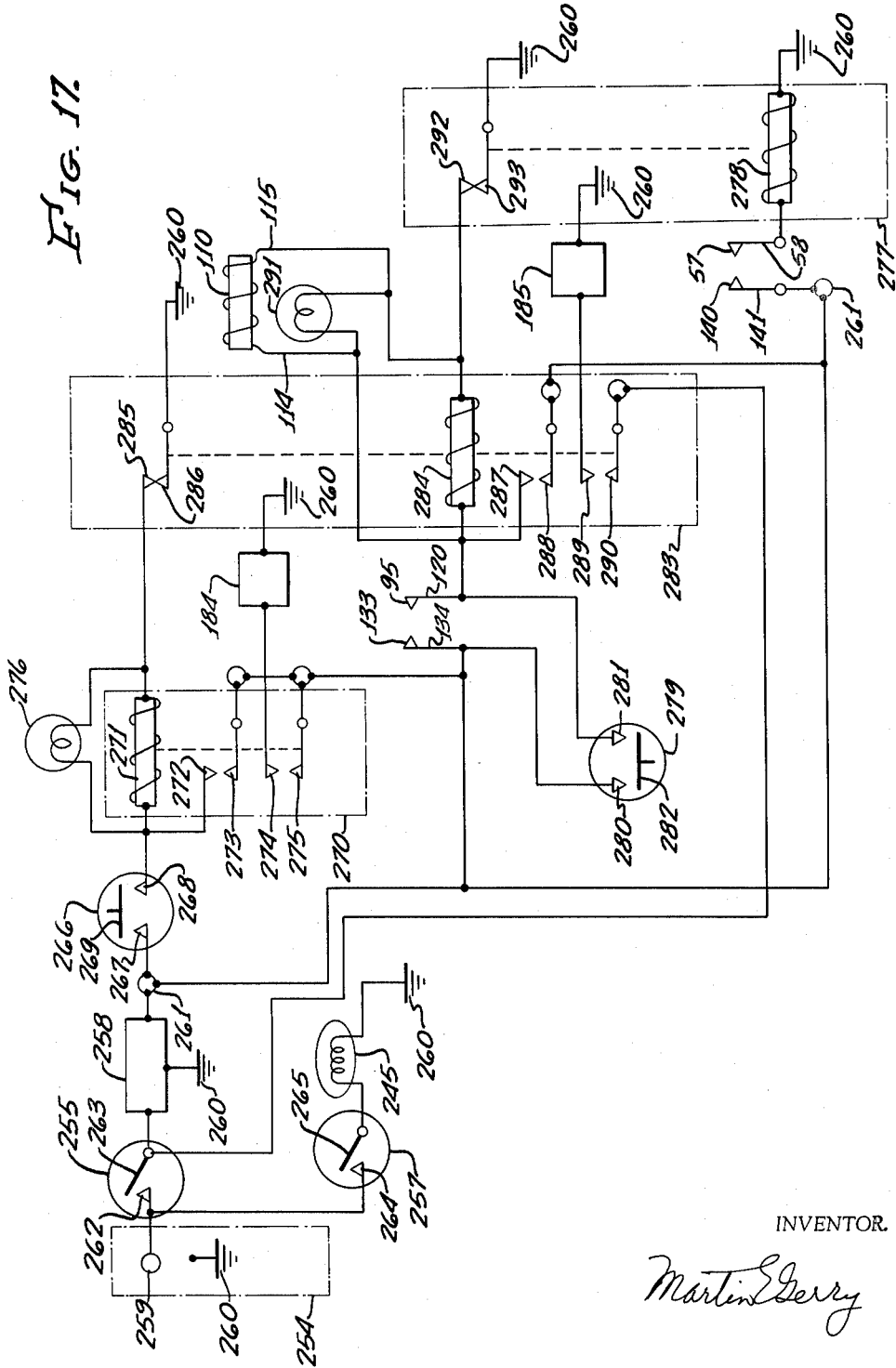

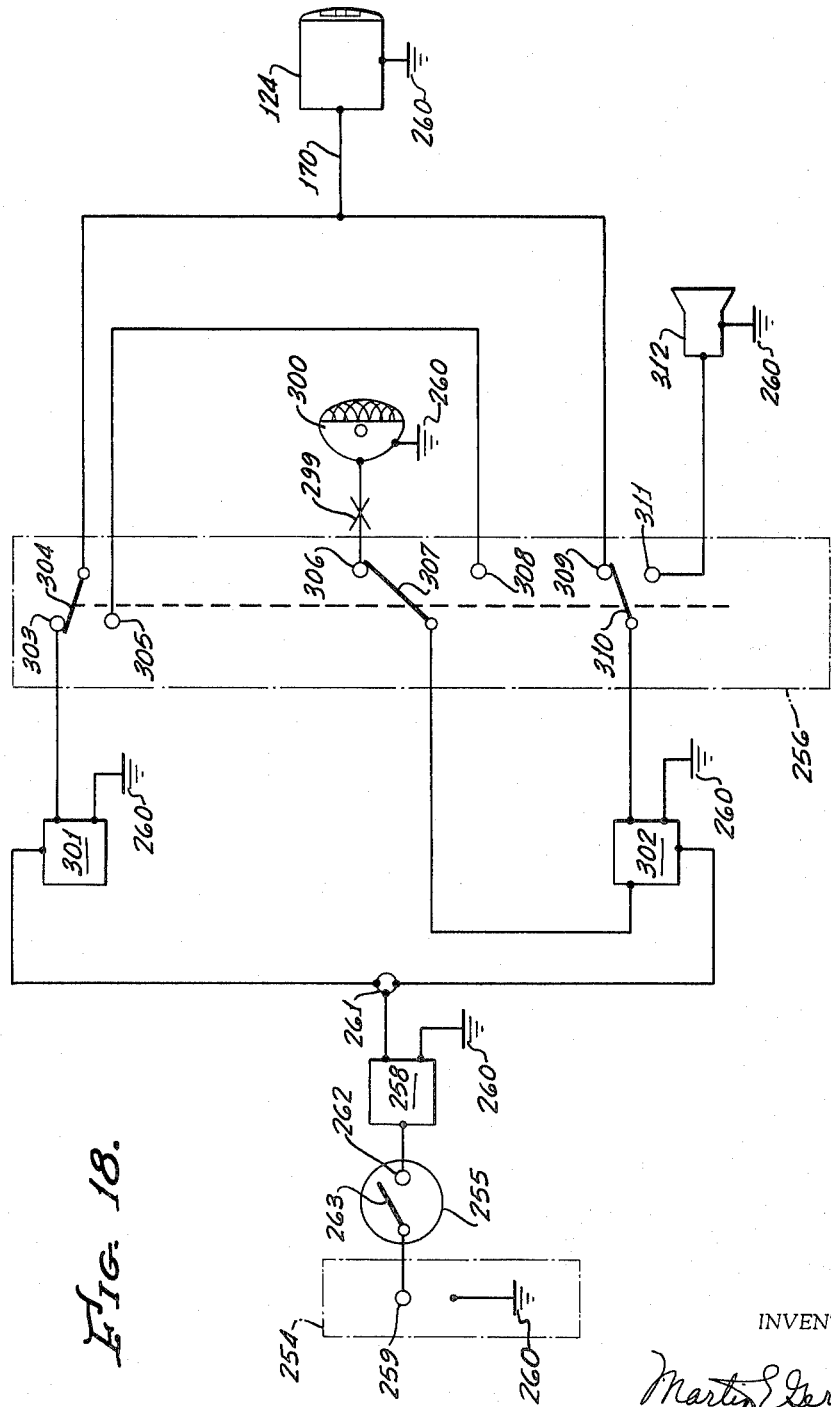

May 17, 1966   M. E. GERRY   3,251,263
SOUND SYNCHRONIZED SLIDE PROJECTOR
Filed March 6, 1963   12 Sheets-Sheet 11
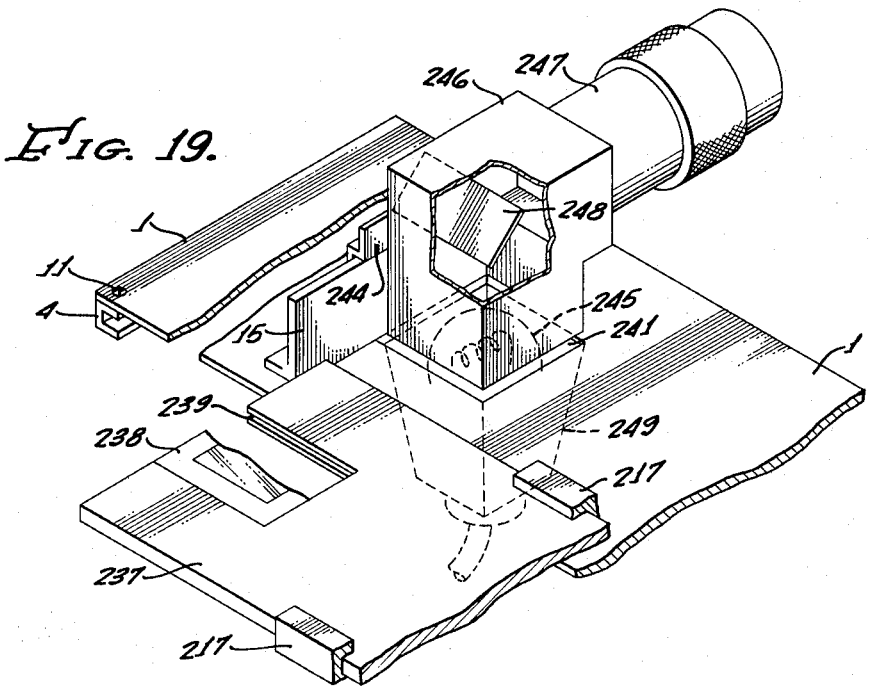
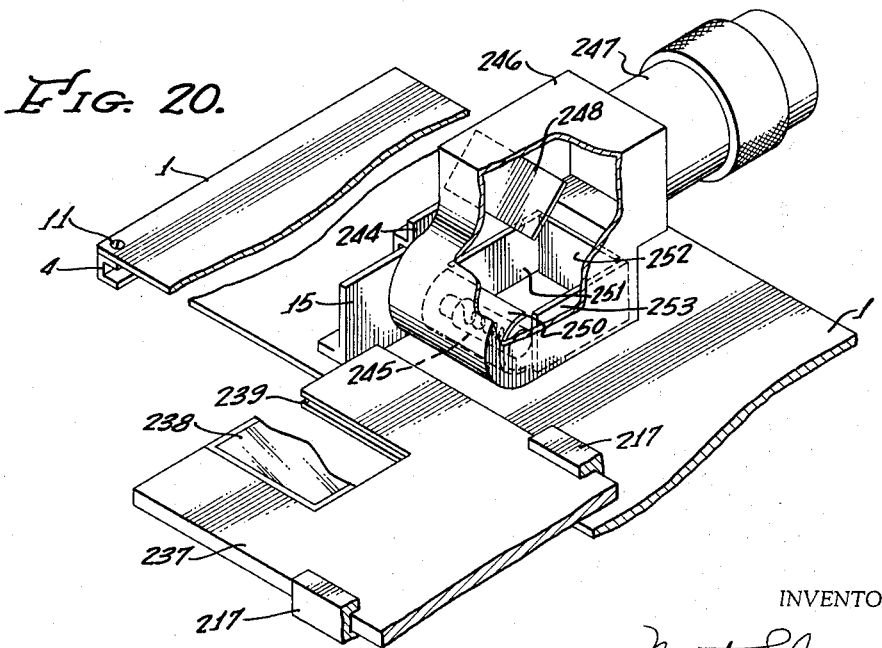
INVENTOR.
Martin E Gerry May 17, 1966  M. E. GERRY  3,251,263
SOUND SYNCHRONIZED SLIDE PROJECTOR
Filed March 6, 1963  12 Sheets-Sheet 12

INVENTOR.
Martin E Gerry

United States Patent Office 3,251,263
Patented May 17, 1966

3,251,263
SOUND SYNCHRONIZED SLIDE PROJECTOR
Martin E. Gerry, Costa Mesa, Calif.
(13452 Winthrope St., Santa Ana, Calif. 92705)
Filed Mar. 6, 1963, Ser. No. 263,164
16 Claims. (Cl. 88—28)

The invention relates to improvements in photographic slide projection machines, the objects of the improvements are to add a new dimension of sound to the optically projected motionless slide or photograph by utilizing a rectangular shaped sound record in physical combination with the said motionless slide or photograph in such a manner so that both the said sound record and slide or said sound record and photograph mounted in the rectangular shaped sound record as integral parts of each other are stationary at all times during the process of recording sound on said sound record, or during the process of playing back the sound previously recorded, to simultaneously optically project the slide or photograph. The invention also relates to a unique and novel motor driven scanner which is an integral part of the sound synchronized slide projector and in which said slide-sound-record in combination, or photograph-sound-record in combination, is inserted by means of a transport mechanism, and sound is either recorded or played back by means of said scanner simultaneously with the viewing of the slide or photograph; recording or reproducing of the sound is accomplished by the scanner by causing the record-reproduce head to move across the rectangular shaped record in a zig-zag or oscillatory pattern in order to magnetically or mechanically pick up and induce an electrical signal into the record-reproduce head from the record or record a signal on the record by means of the record-reproduce head, at the same time as the slide or photograph mounted in said rectangular shaped record is optically projected. The invention also relates to a control circuit which enables the scanner to automatically scan from beginning of the record to the end of the record, to automatically and quickly return the scanner to the start position at the completion of the scanning process or at the operator's command, and to automatically reset the scanner to the start position in order to enable a recycling of the scanning process.

Figure 2:
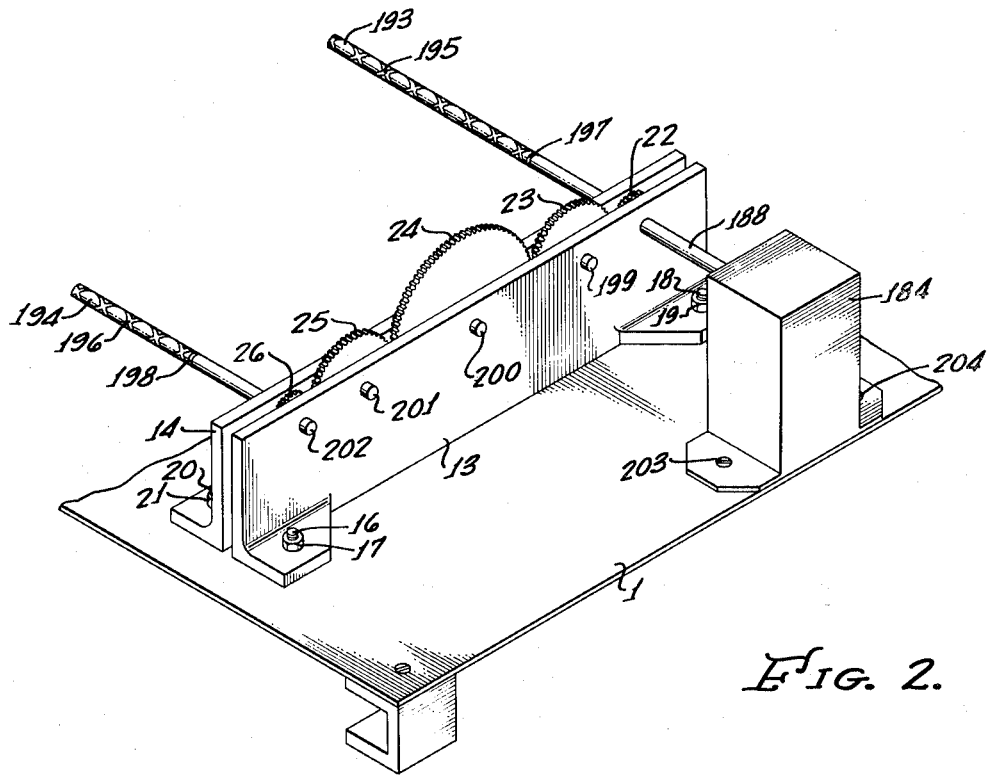
Figure 3:
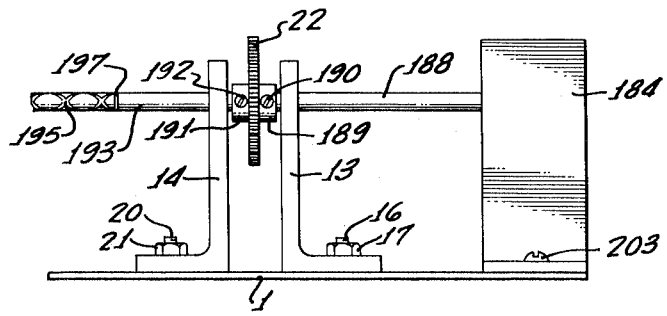
Figure 4:
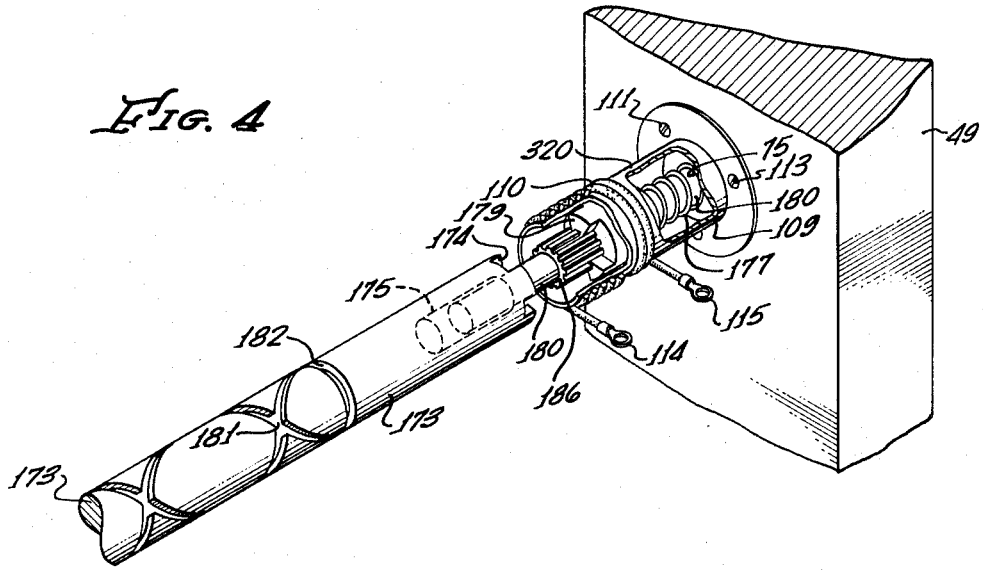
Figure 5:
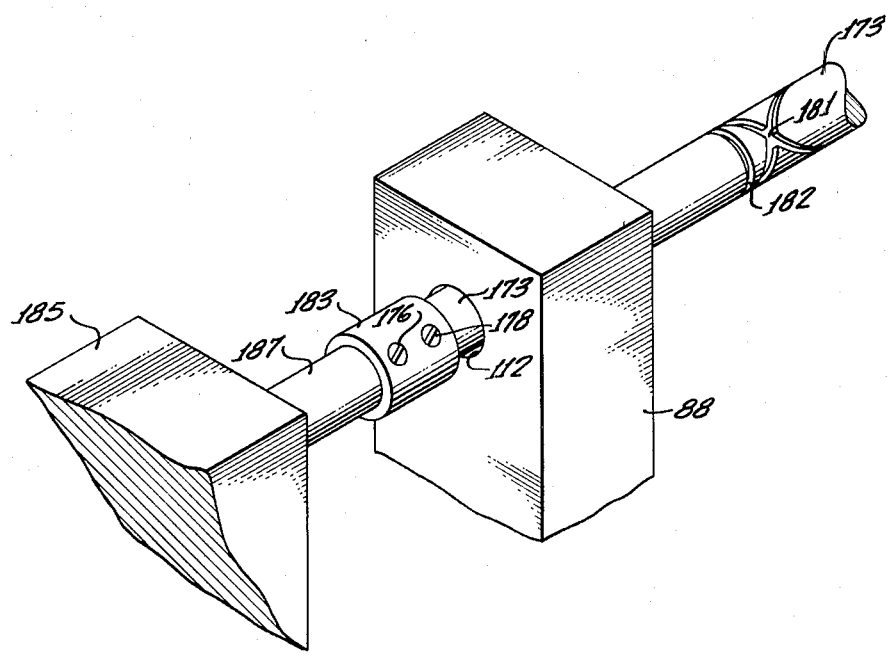
Figure 9:
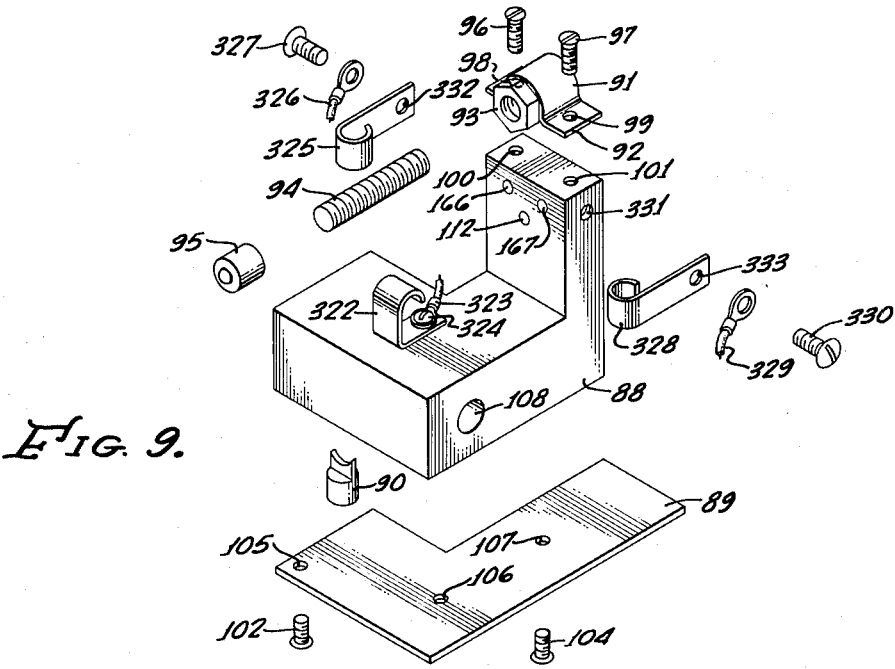
Figure 10:
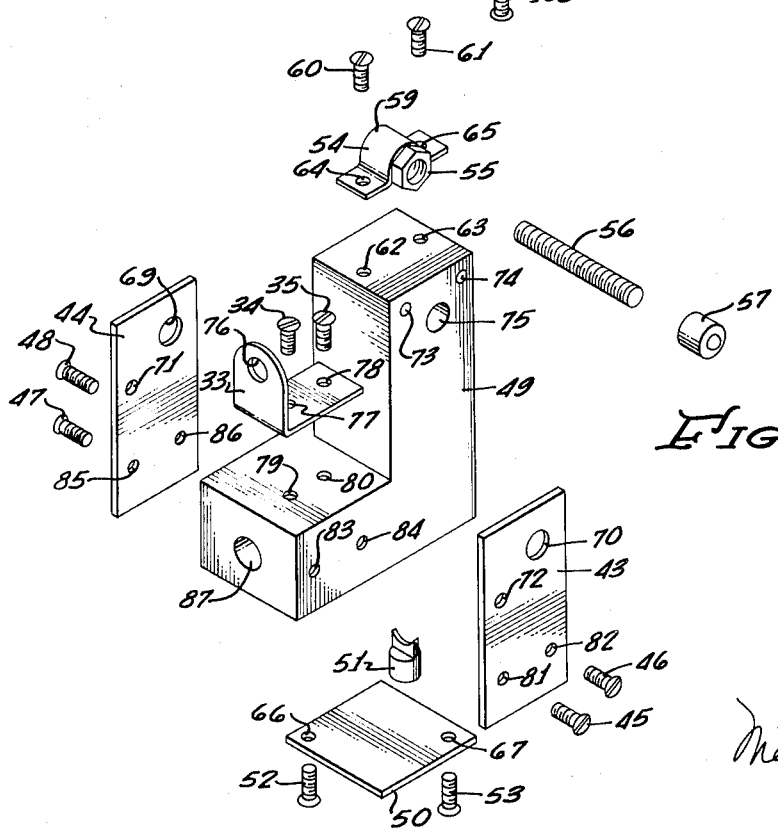
Figure 13:
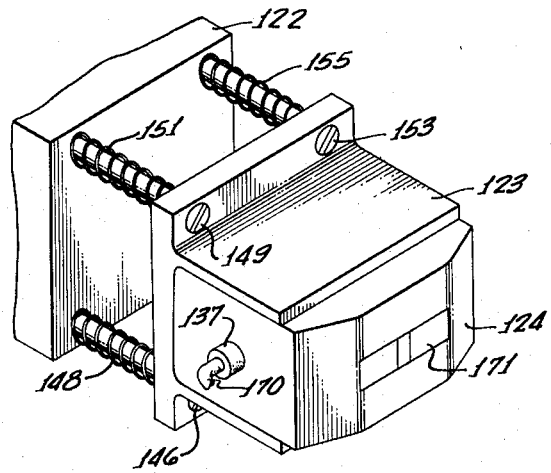
Figure 14:
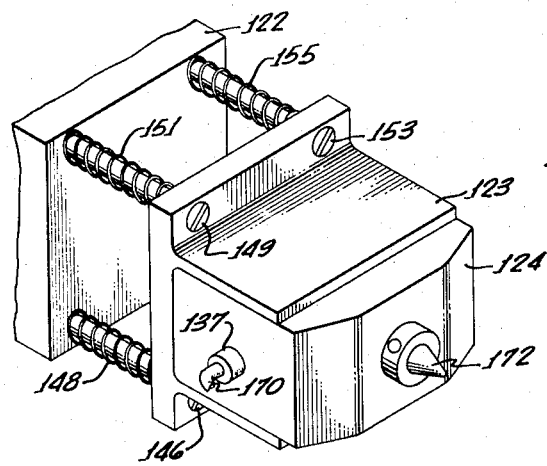
Figure 15:
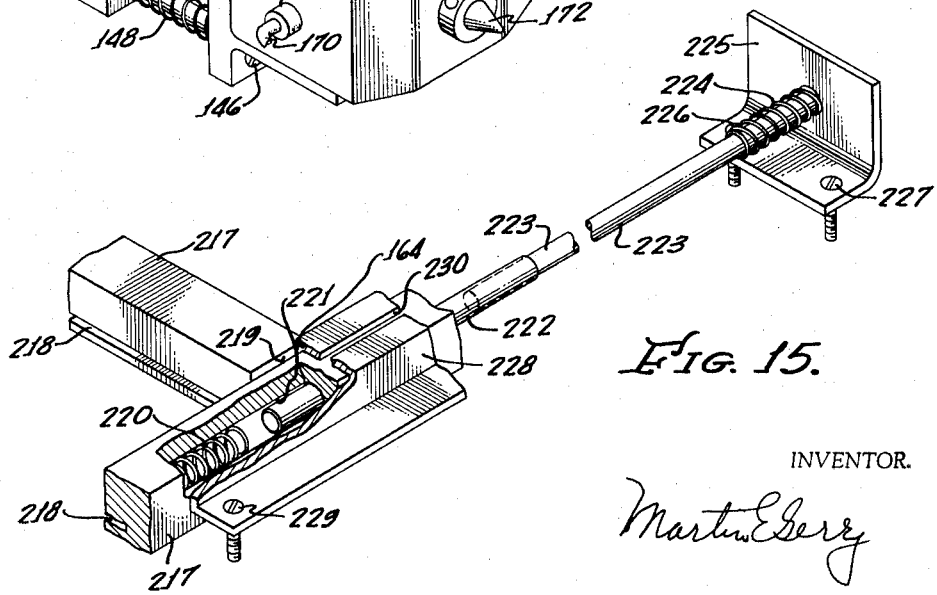
Figure 16:
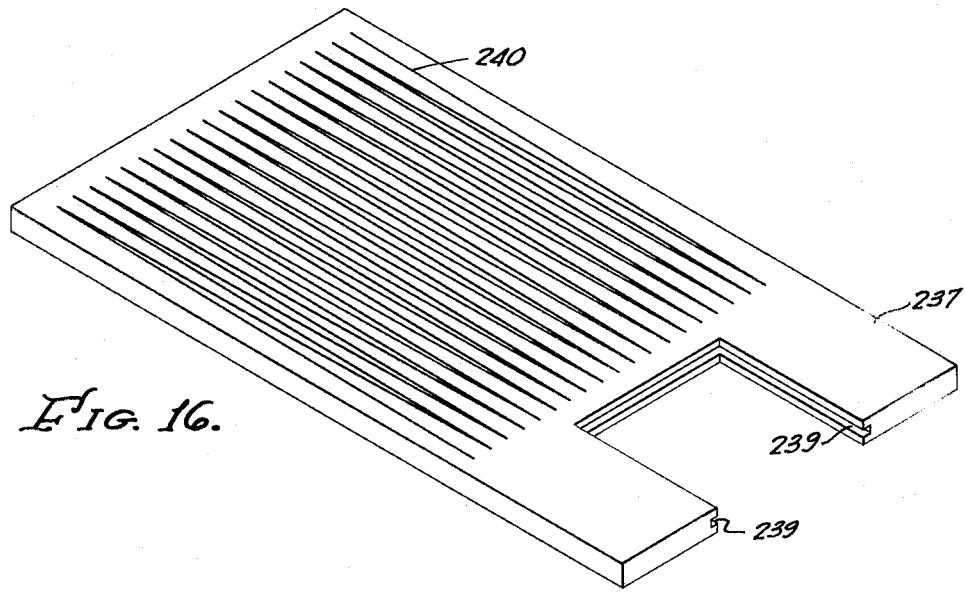
Figure 21:
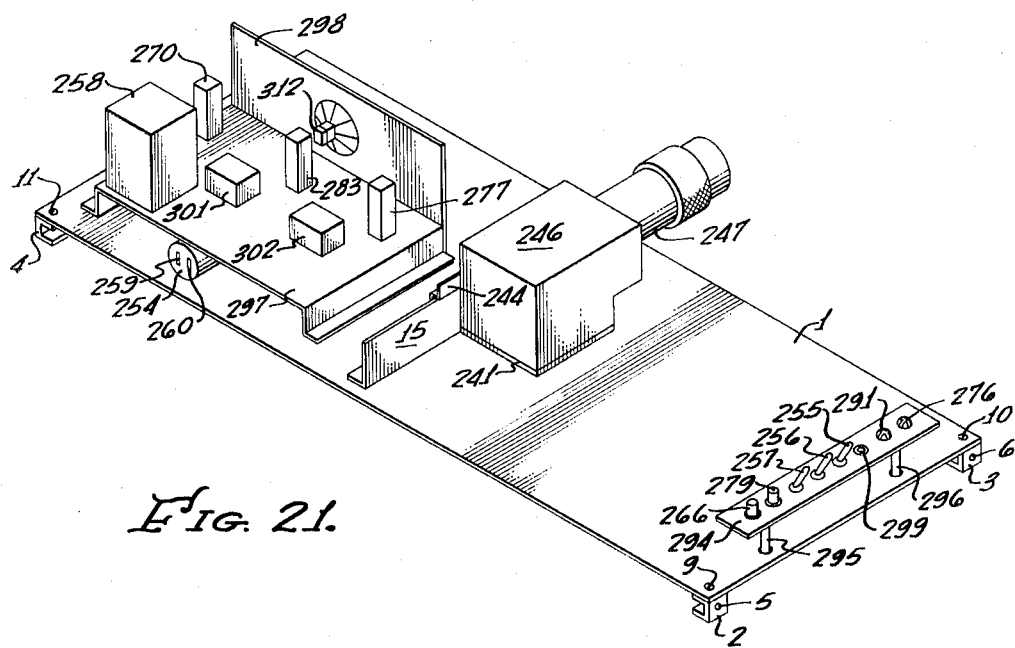
Figure 22:
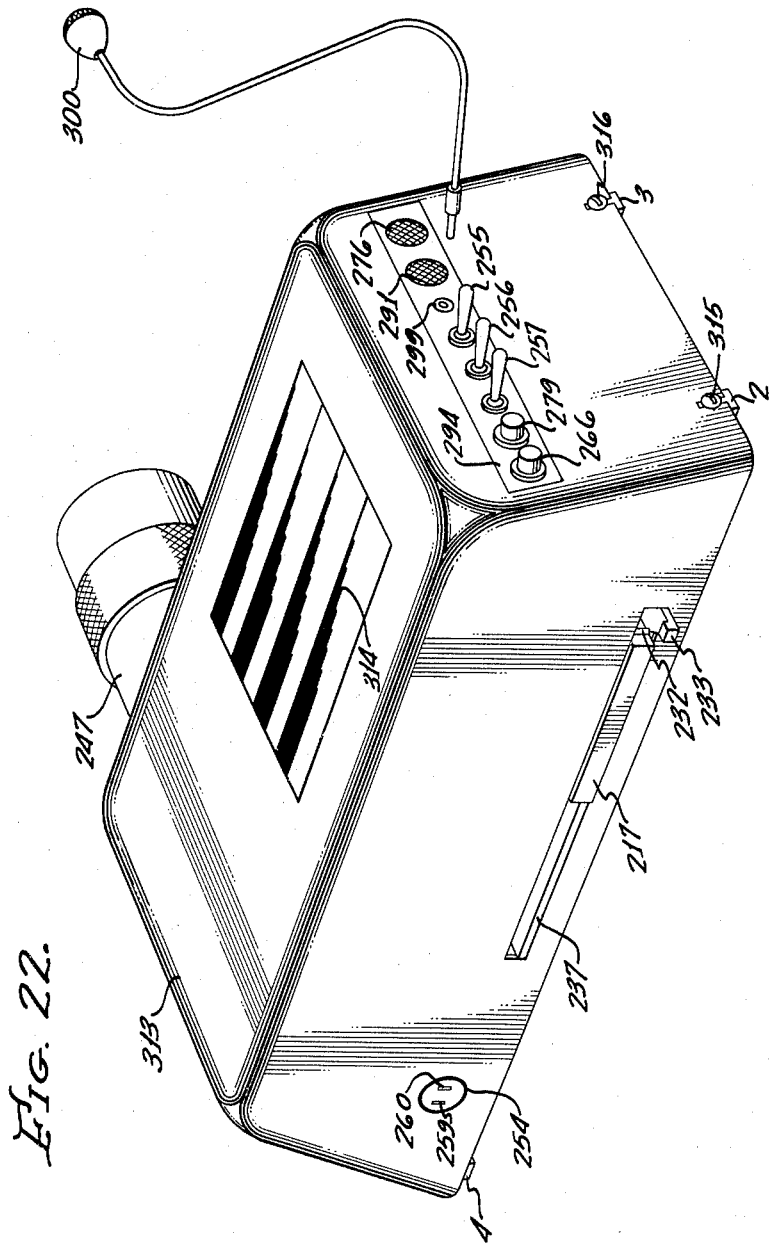

One form of the invention is illustrated in the accompanying drawings in which:

FIGURE 1 an isometric composite view of the scanner;

FIGURE 2 an isometric view of the gear train assembly for latitudinal (horizontal) sweep of the scanner;

FIGURE 3 a plan view of the drive motor and a portion of the latitudinal drive shaft of the scanner;

FIGURE 4 an isometric view of a portion of the longitudinal (vertical) drive shaft, electromechanical clutch, and a portion of the front carriage block of the scanner;

FIGURE 5 an isometric view of a portion of the longitudinal drive shaft, a portion of the rear carriage block, a portion of the reposition motor, and a reposition motor shaft to longitudinal drive shaft coupler of the scanner;

FIGURE 6 an isometric view of the pinion gear assembly for latitudinal to longitudinal coupling and the pinion gear bearing assembly of the scanner;

FIGURE 7 a plan view of the end of the pinion gear shown resting in the bearing of the scanner;

FIGURE 8 an isometric view of a portion of the pinion gear end shaft with its worm gear mounted thereon and coupled to the smallest of the gears of the longitudinal gear train assembly of the scanner;

FIGURE 9 an isometric view of the rear carriage assembly of the scanner;

FIGURE 10 an isometric view of the front carriage assembly of the scanner;

FIGURE 11 an isometric view of a portion of the longitudinal assembly including record-reproduce head transport assembly and power and electrical signal commutation means of the scanner;

FIGURE 12 an isometric view of the record-reproduce head mount and head transport assembly of the scanner;

FIGURE 13 an isometric view of a magnetic record-reproduce head and head mounting assembly;

FIGURE 14 an isometric view of a stylus type record-reproduce head and head mounting assembly;

FIGURE 15 an isometric view of a section of record transport and record positioning mechanism of the scanner;

FIGURE 16 an isometric view of the rectangular record showing the zig-zag recording trace and the cut-out slot provided for inserting the slide or photograph;

FIGURE 17 a schematic diagram of an electromechanical control circuit for the scanner and for the optical projection lamp control;

FIGURE 18 a schematic diagram of record-reproduce circuit of the sound synchronized slide projector;

FIGURE 19 an isometric view of the optics for slide projection mounted on the scanner;

FIGURE 20 an isometric view of the optics for photograph projection mounted on the scanner;

FIGURE 21 an isometric view of the record-reproduce and electromechanical control chassis and optical assembly mounted on the scanner base plate;

FIGURE 22 an isometric view of the assembled sound-synchronized slide projector including scanner, electromechanical and optical control circuit and projector cover.

The scanner is comprised of parts that are mounted on base 1, FIGURES 1, 2, 3, 6, 19, 20, 21 which is affixed to feet 2 and 3, FIGURES 1, 21, 22, foot 4 FIGURES 1, 19, 20, 21, 22, and foot 7, FIGURE 6 respectively by means of screws 9 and 10 FIGURES 1, 21, screw 11 FIGURES 1, 19, 20, 21, and screw 12, FIGURE 6. Bracket 13 FIGURES 1, 2, 3 retaining the latitudinal drive gear assembly is mounted on base 1, FIGURES 1, 2, 3, 6, 19, 21, 22 by means of screw 16 and nut 17, FIGURES 1, 2, 3, and screw 18 and nut 19 FIGURE 2. Bracket 14 FIGURES 1, 2, 3 is held to base 1, FIGURES 1, 2, 3, 6, 19, 20, 21 by means of screw and nut 20 and 21 FIGURES 2 and 3. Bracket 15 FIGURES 1, 6, 19, 20, 21 is welded or otherwise affixed to base 1, FIGURES 1, 2, 3, 6, 19, 20, 21.

Gear 22, FIGURES 1, 2, 3 is mounted by screw 190 FIGURE 3 threaded into flange 189 FIGURE 3 and coupled mechanically to scan motor shaft 188 FIGURES 1, 2, 3 and by screw 192 FIGURE 3 threaded into flange 191 FIGURE 3 and coupled mechanically to latitudinal drive shaft 193 FIGURES 1, 2, 3, 6.

Gear 23, FIGURES 1, 2 is coupled to gear 22 and gear 24 FIGURES 1, 2 and is mounted on shaft 199 FIGURES 1, 2 in a similar manner to the mounting of gear 22.

Gear 24, FIGURES 1, 2 is mounted on shaft 200 FIGURES 1, 2 in a manner similar to the mounting gear 22 and is mechanically coupled to gears 23 and 25 of FIGURES 1, 2.

Gear 25 FIGURES 1, 2 is mounted on shaft 201 FIGURES 1, 2 in a manner similar to the mounting of gear 22 and is mechanically coupled to gears 24 and 26 of FIGURES 1, 2.

Gear 26 FIGURES 1, 2 is mounted on shaft 202 FIGURES 1, 2, is mechanically coupled to gear 25 and mechanically couples shaft 202, FIGURES 1, 2 to latitudinal drive shaft 194 FIGURES 1, 2 in a similar manner to which gear 22 mechanically couples aforementioned scan motor shaft 188 to aforementioned latitudinal drive shaft 193. The entire gear assembly comprised of gears 22, 23, 24, 25 and 26 and their respective shafts are mounted between heretofore said brackets 13 and 14.

Scan motor 184, FIGURES 1, 2, 3, 17 of which aforementioned scan motor drive shaft is an integral part and mechanically part of said scan motor armature, is mechanically held to said base 1 by screw 203 FIGURES 1, 2, 3 and screw 204 FIGURES 1, 2.

Gear 27, FIGURE 1 is mounted at the end of latitudinal drive shaft 193 FIGURES 1, 2, 3, 6 and is mechanically coupled to horizontally reciprocating pinion gear 28 FIGURES 1, 6, 7, 8. Said latitudinal drive shaft 193 is supported by and rotates in hole 205 of bracket 15 FIGURE 6.

Pinion gear 28, FIGURES 1, 6, 7, 8 has a horizontally reciprocating motion and extends on one end through a hole in aforementioned bracket 15 and is supported by ball bearing 209, FIGURES 1, 6, 7 which is mechanically fitted into and held by lower bearing holder 206 FIGURES 1, 6, 7 affixed to said base 1 by screws 207 and 208 FIGURE 6, and by upper bearing holder 212 FIGURES 1, 6 mechanically held to said lower bearing holder 206 by screw 216 FIGURES 1, 6 extending through hole 214 FIGURE 6 into tapped hole 211 FIGURE 6 and by screw 215 FIGURES 1, 6 extending through hole 213 FIGURE 6 into tapped hole 210 FIGURE 6. Said pinion gear 28 ends on the other end in a shaft which passes through hole 76 FIGURES 6, 8, 10 of bracket 33 FIGURES 1, 6, 8, 10 and is supported by said bracket 33 and has mounted on its end worm gear 29 FIGURES 1, 8 affixed to said shaft of 28 by screw 36 FIGURE 8. Aforementioned bracket 33 is affixed mechanically to front carriage block 49 FIGURES 1, 4, 5, 6, 10, 11 by screw 34 FIGURES 6, 8, 10 and screw 35 FIGURES 8, 10.

Gear 30, FIGURES 1, 8 is the first of a series of gears assembled in order to reduce the longitudinal (vertical) motion of the scanner record-reproduce head assembly 121 FIGURE 1 with respect to the latitudinal motion of said head assembly. Said gear 30 is mounted on shaft 40, FIGURE 8 and held to said shaft 40 by screw 37, FIGURE 8. Said shaft 40 is mounted in and extends through hole 71, FIGURE 10 of mounting plate 44, FIGURES 1, 10 and hole 72, FIGURES 8, 10 of mounting plate 43, FIGURES 1, 10 and held in alignment by collar 39, FIGURE 8, said collar is held in position by screw 38, FIGURE 8. Said gear 30 is mechanically coupled to aforementioned worm gear 29 and gear 31, FIGURE 1.

Gear 31, FIGURE 1 which mechanically couples said gear 30 with gear 32, FIGURE 1, is mounted in a like manner to that of said gear 30 on shaft 68, FIGURE 1 which extends through hole 69, FIGURES 8, 10 of mounting plate 44, FIGURES 1, 10 and through hole 70, FIGURE 10 of mounting plate 43, FIGURES 1, 10. A collar similar to collar 39, FIGURE 8 aligns said shaft 68.

Gear 32, FIGURE 1, which mechanically couples to aforementioned gear 31, is mounted on shaft 180, FIGURE 4, said shaft 180 extending through hole 75, FIGURES 4, 10 of front carriage block 49, FIGURES 1, 4, 6, 10, 11 and is mechanically secured to said shaft 180 in a manner similar to the mounting of aforementioned gear 30 on its aforementioned shaft 40.

The front carriage assembly 41 FIGURE 1 is comprised of the following assembled parts: mounting plate 43, FIGURES 1, 10 is mechanically held to the front carriage block 49, FIGURES 1, 4, 6, 10, 11 by means of screws 45 and 46, FIGURES 1, 10 which extend respectively through holes 81 and 82 in said mounting plate 43 and are threaded respectively into holes 83 and 84, FIGURE 10 of said front carriage block 49. Mounting plate 44, FIGURES 1, 10 is mechanically held to the front carriage block 49, FIGURES 1, 4, 6, 10, 11 by means of screws 47 and 48, FIGURE 10 which extend respectively through holes 85 and 86 in said mounting plate 44 and are threaded respectively into holes 83 and 84, FIGURE 10 of said front carriage block 49. Bracket 33, FIGURES 1, 6, 8, 10 is mechanically held to the said front carriage block 49 by means of screw 34 FIGURES 6, 8, 10 which extends through hole 77, FIGURE 10 of said bracket 33 into threaded hole 79, FIGURE 10 of the said front carriage block 49, and by means of screw 35, FIGURES 8, 10 which extends through hole 78, FIGURE 10 of said bracket 33 into threaded hole 80 of the said front carriage block 49. Contact bracket assembly 54, FIGURES 1, 10 comprised of bracket 59, FIGURE 10 and insulating retaining nut 55, FIGURE 10 is mounted on aforementioned front carriage block 49 by means of screws 60 and 61, FIGURE 10 which respectively extend through holes 64 and 65, FIGURE 10 of said bracket 59 into respectively threaded holes 62 and 63, FIGURE 10, and said contact bracket assembly 54 is therefore mechanically held to said front carriage block 49. Screw 56, FIGURE 10 is inserted into insulating threaded nut 55, FIGURE 10 and mechanically held by said nut 55. Contact 57, FIGURES 1, 10, 17 is screwed on to and mechanically held by screw 56, FIGURE 10. Scanning stylus 51, FIGURES 1, 10 is inserted into a vertically positioned hole at the bottom of aforementioned front carriage block 49, said vertically positioned hole is located at an angle of 90 degrees with respect to hole 87 of said front carriage block 49, and said scanning stylus 51 is retained by plate 50, FIGURE 10 mechanically affixed to front carriage block 49 by means of screws 52 and 53, FIGURE 10 which extend respectively through holes 66 and 67 FIGURE 10 of said plate 50 into threaded holes located in the bottom of aforementioned front carriage block 49.

The rear carriage assembly 42, FIGURE 1 is comprised of the following assembled parts: the rear carriage block 88, FIGURES 1, 5, 9, 11 made of an electrically insulating material and which has a vertical hole in the bottom located at an angle positioned 90 degrees with respect to hole 108, FIGURE 9 and in which scanning stylus 90, FIGURES 1, 9 is retained by plate 89, FIGURES 1, 9 held mechanically to said rear carriage block 88 by screws 102, 103, and 104, FIGURE 9, which extend respectively through holes 105, 106 and 107 FIGURE 9 of said plate 89 into threaded holes in aforementioned rear carriage block 88. Contact bracket assembly 91, FIGURES 1, 9, comprised of bracket 92, FIGURE 9 and insulating retaining nut 93, FIGURE 9 is mounted on said rear carriage block 88 by means of screws 96 and 97, FIGURE 9 which extend respectively through holes 98 and 99, FIGURE 9 into threaded holes 100 and 101 respectively, FIGURE 9 and mechanically holds said contact bracket assembly 91 to said rear carriage block 88. Screw 94, FIGURES 1, 9 is threaded into and mechanically held by insulating nut 93, FIGURE 9 and contact 95 FIGURES 1, 9, 17 is screwed on to and mechanically held by screw 94, FIGURES 1, 9. Common signal power return pick-off clip 322, FIGURES 9, 11 is mounted by means of screw 324, FIGURES 9, 11 extending through hole in said clip 322 and mechanically holding wire lug 323 FIGURES 9, 11 and said clip 322 to insulating rear carriage block 88 (FIGURES 1, 5, 9, 11. Positive signal current carrying clip 325 FIGURES 9, 11 is mounted by means of screw 327, FIGURES 9, 11 extending through wire lug 326, FIGURES 9, 11 and hole 332, FIGURE 9 of said clip 325 into hole 331, FIGURE 9 of aforementioned rear carriage block 88. Positive direct current carrying power clip 328, FIGURES 9, 11 is mounted by means of screw 330, FIGURES 9, 11 extending through wire lug 329, FIGURES 9, 11 and through hole 333 of said clip 328 into threaded hole 331 of aforementioned insulating rear carriage block 88 and said screw 330 mechanically holds said clip 328 and said wire lug 329 to said rear carriage block 88.

The head transport assembly 121, FIGURE 1 is comprised of the following parts: the transport block 122, FIGURES 1, 11, 12, 13, 14 made of electrically insulating material and which has holes 161 and 162, FIGURES 11, 12 parallel to each other bored through said block 122, and in the center of the block has hole 163, FIGURE 12 bored through said block 122, and has hole 165 bored from the top center face of said block 122 half way through the block at an angle of 90 degrees with respect to hole 163 of said block 122. Scanning stylus 125, FIGURES 1, 12 is situated in hole 165, FIGURE 12 and is retained by two directional drive slot 181 or reverse direction slot 182, FIGURES 4, 5 of longitudinal drive shaft 173, FIGURES 1, 4, 5, 11 on the lower end of said scanning stylus 125, and plate 126, FIGURES 1, 11, 12 on the upper end of said scanning stylus 125. Said plate 126 is mechanically held to said block 122 by screws 118, 119, 127, 128, FIGURE 12 which respectively extend through holes 116, 117, 129, 130, FIGURE 12 into respectively threaded holes 159, 152, 131, 132, FIGURE 12 of said transport block 122. Head mount 123, FIGURES 11, 12, 13 14 is mechanically suspended from aforementioned transport block 122 by partially threaded screw 146, FIGURES 11, 12, 13, 14 which extends through hole 147, FIGURE 12 of said head mount 123 through compression spring 148, FIGURES 11, 12, 13, 14 into threaded hole 131, FIGURE 12 of said transport block 122, and by partially threaded screw 149, FIGURES 11, 12, 13, 14 which extends through hole 150, FIGURE 12 of said head mount 123, through compression spring 151, FIGURES 11, 12, 13, 14 into threaded hole 152, FIGURE 12 of said transport block 122, and by partially threaded screw 153, FIGURES 11, 12, 13, 14 which extends through hole 154, FIGURE 12 of said head mount 123, through compression spring 155, FIGURES 11, 12, 13, 14 into threaded hole 132, FIGURE 12 of said transport block 122, and by partially threaded screw 156, FIGURE 12 which extends through hole 157 FIGURE 12 of said head mount 123 through compression spring 158, FIGURE 12 into threaded hole 159, FIGURE 12 of said transport block 122, thus permitting head 124, FIGURES 11, 13, 14, 18, mechanically mounted by its mounting stud and nut which projects through hole 160, FIGURE 12 of said head mount 123 to position itself upon the record 237, FIGURES 1, 16, 19, 20, 22 with the required mechanical pressure on said record 237 in order to properly record or play-back said record 237. Berrylium copper contact spring 133, FIGURES 1, 11, 12, 17 is mechanically mounted on and affixed to aforementioned insulating transport block 122, by means of screw 135, FIGURE 12 extending through hole 136, FIGURE 12 in said contact spring 133 into threaded hole 139, FIGURE 12 of said transport block 122. Berrylium copper contact spring 140, FIGURES 1, 11 12, 17 is mechanically mounted on and affixed to aforementioned insulating transport block 122, by means of screw 142, FIGURE 12 extending through hole 143, FIGURE 12 in said contact spring 140 into threaded hole 139, FIGURE 12 of said transport block 122. Aforementioned spring contacts 133 and 140 are electrically at the same potential by connecting contact lead 134, FIGURES 1, 11, 12 mechanically and electrically affixed to said spring contact 133, together with contact lead 141, FIGURES 1, 11, 12 mechanically and electrically affixed to said spring contact 140. Braided copper shield 137, FIGURES 11, 13, 14 acting as an electrical shield and signal ground return of the record-reproduce head 124, FIGURES 11, 13, 14, 18 is mechanically held in place by bracket 138, FIGURE 11, and electrically connected to berrylium copper clip 145, FIGURE 11, and both bracket 138 and clip 145 are mechanically affixed to aforementioned insulating transport block 122 by means of screw 144, FIGURE 11. Head wire connecting signal lead 170, FIGURES 11, 13, 14, 18 is held in place and electrically and mechanically connected to berrylium copper clip 317, FIGURE 11 by means of screw 318, FIGURE 11, and both clip 317 and signal lead 170 are mechanically affixed to aforementioned insulating transport block 122. Berrylium copper clip 321, FIGURE 11 is mechanically affixed to said head transport block 122 in a manner similar to aforementioned clip 317 and electrically connected to wire 319, FIGURE 11 said wire 319 is in turn electrically and mechanically connected by screw 135 to aforementioned contact spring 133, FIGURES 1, 11, 12, 17.

Longitudinal motion of the head transport assembly 121, FIGURE 1 is accomplished by the longitudinal drive shaft 173, FIGURES 1, 4, 5, 11 which is inserted into hole 163, FIGURE 12 of head transport block 122, FIGURES 1, 11, 12, 13, 14 and extends on one side through hole 112, FIGURES 5, 9, 11 of the rear carriage block 88, FIGURES 1, 5, 9, 11 into coupler 183, FIGURES 5, 11 which is mechanically held to end of shaft 173, FIGURES 1, 4, 5, 11 by screw 178, FIGURES 5, 11. Said coupler 183 also mechanically holds shaft of reposition motor 187, FIGURES 5, 11 by means of screw 176, FIGURES 5, 11. Said shaft 187 is mechanically part of the armature of the reposition motor 185, FIGURES 1, 5, 17 which said reposition motor 185 is mounted on part of plate 89, FIGURES 1, 9 by means of mounting screws underneath plate 89 extending into threaded holes in the frame of said reposition motor 185. Longitudinal drive shaft 173, FIGURES 1, 4, 5, 11 has one end facing the front carriage block 49, FIGURES 1, 4, 6, 10, 11 milled in the form of three teeth 174, FIGURE 4 spaced 120 degrees apart from center to center of each tooth so that said teeth 174, form part of a clutch. Said shaft 173 has hole 175, FIGURE 4 in which shaft 180, FIGURE 4 is inserted and mechanically supports said shaft 173. When electromechanical clutch assembly 109, FIGURE 4 is activated by the application of power to solenoid coil 110, FIGURES 4, 17 through terminals 114 and 115, FIGURES 4, 17, said shaft 173 is permitted to rotate freely with respect to said shaft 180 when electrical power is also applied to reposition motor 185, FIGURES 1, 5, 17. Head transport assembly 121, FIGURE 1 is then moved in a longitudinal path due to the fact that scanning stylus 125, FIGURES 1, 12 is engaged with and moves in two directional drive slot 181, FIGURES 4, 5 and the two reverse direction slots 182, FIGURES 4, 5 located at either end of said shaft 173. Spdine gear 186, FIGURE 4 is tightly press fitted on shaft 180, FIGURE 4 and said shaft 180 extends through spring 177, FIGURE 4 and through hole 75, FIGURES 4, 10 of front carriage block 49, FIGURES 1, 4, 6, 10, 11 and has mounted and mechanically held to its end, gear 32, FIGURE 1. Gear clutch 179, FIGURE 4, which is milled in the form of three teeth spaced 120 degrees apart from center to center of each tooth so that said teeth of gear clutch 179 are grooved to fit on the teeth of, and complement and accommodate the teeth of the spline gear 186, FIGURE 4. Said gear clutch 179 is made of high permeability steel, so that a magnetic field caused by a current flowing in coil 110, FIGURES 4, 17 would retract said gear clutch 179 from its meshed position with gear clutch teeth 174, FIGURE 4, compressing spring 177, FIGURE 4 situated between the back of gear clutch 179, FIGURE 4 and the front carriage block 49, FIGURES 1, 4, 6, 10, 11, said gear clutch 179 moving freely on the teeth of said spline gear 186 to the retracted position shown in FIGURE 4, thusly disengaging the longitudinal drive mechanism from the latitudinal drive mechanism. Solenoid coil 110, FIGURES 4, 17 is wound on electrically insulating solenoid frame 320, FIGURE 4 which is mounted on and mechanically supported by screws 111 and 113, FIGURE 4 which extend through holes in the flange of said solenoid frame 320, FIGURE 4 into threaded holes in the front carriage block 49, FIGURES 1, 4, 6, 10, 11. When, due to a current flowing in said solenoid 110, said gear clutch 179 is disengaged from said gear clutch 175, the reposition motor 185, FIGURES 1, 5, 17 moves the head transport assembly 121, FIGURE 1 in a longitudinal direction only, or in other words the control circuit FIGURE 17, described below causes the scan motor 184, FIGURES 1, 2, 3, 17 to stop when the electromechanical clutch assembly 109, FIGURE 4 and reposition motor 185, FIGURES 1, 5, 17 are electrically energized. Likewise control circuit FIGURE 17 described below, causes teeth 174 and 179, FIGURE 4 to mesh with one another and scan motor 184, FIGURES 1, 2, 3, 17 to electrically energize, when current in solenoid coil 110, FIGURES 4, 17 stops flowing causing the simultaneous latitudinal and longitudinal driving of the aforementioned head transport assembly 121, FIGURE 1. Steel guide rods 168 and 169, FIGURES 1, 11 assist in the mechanical alignment of the head transport assembly 121, FIGURE 1 and the record-reproduce head 124, FIGURES 11, 13, 14, 18 by being positioned equidistant from longitudinal drive shaft 173, FIGURES 1, 4, 5, 11. Guide rod 168, FIGURES 1, 11 extends into hole 74, FIGURES 10, 11 of front carriage block 49, FIGURES 1, 4, 6, 10, 11, through hole 162, FIGURES 11, 12, of transport block 122, FIGURES 1, 11, 12, 13, 14 in hole 166, FIGURES 9, 11 of rear carriage block 88, FIGURES 1, 5, 9, 11. Guide rod 169, FIGURES 1, 11 extends into hole 73, FIGURES 10, 11 of front carriage block 49, FIGURES 1, 4, 6, 10, 11, through hole 161, FIGURES 11, 12 of transport block 122, FIGURES 1, 11, 12, 13, 14 into hole 167, FIGURES 9, 11 of rear carriage block 88, FIGURES 1, 5, 9, 11. An electrical conducting path is provided between beryllium copper clip 145, FIGURE 11, steel longitudinal drive shaft 173, FIGURES 1, 4, 5, 11, and beryllium copper clip 322, FIGURES 9, 11 by causing said clips 145 and 322 to cooperate and make electrical contact with said drive shaft 173. An electrical conducting path is provided between beryllium copper clip 317, FIGURE 11, steel guide rod 168, FIGURES 1, 11 and beryllium copper clip 325, FIGURES 9, 11 by causing said clips 317 and 325 to cooperate and make electrical contact with said guide rod 168. An electrical conducting path is provided between beryllium copper clip 321, FIGURE 11, steel guide rod 169, FIGURES 1, 11 and beryllium copper clip 328, FIGURES 9, 11 by causing said clips 321 and 328 to cooperate and make electrical contact with said guide rod 169.

Latitudinal motion of the head transport assembly 121, FIGURE 1, is accomplished by latitudinal drive shaft 193, FIGURES 1, 2, 3, 6, which is mounted in hole 205, FIGURE 6 of bracket 15, FIGURES 1, 6, 19, 20, 21, and which extends through hole 87, FIGURE 10, of front carriage block 49, FIGURES 1, 4, 6, 10, 11, extends through a hole in bracket 14, FIGURES 1, 2, 3 and is mechanically held by screw 192, FIGURE 3 of cylindrical bevel 191, FIGURE 3 of gear 22, FIGURES 1, 2, 3. Scanning stylus 51, FIGURES 1, 10 inserted in front carriage block 49, FIGURES 1, 4, 6, 10, 11 is guided by two directional drive slot 195, FIGURES 1, 2, 3, and front carriage direction reversing slots 197, FIGURES 1, 2, 3 located on both ends of said latitudinal drive shaft 193, permitting latitudinal reciprocating motion of the front carriage assembly 41, FIGURE 1, when driven by scan motor 184, FIGURES 1, 2, 3, 17; synchronized with latitudinal drive shaft 194, FIGURES 1, 2 which is mounted in a hole in said bracket 15 on one end in a manner similar to the mounting of aforementioned drive shaft 193, extending through hole 108, FIGURE 9 of rear carriage block 88, FIGURES 1, 5, 9, 11, and through a hole in bracket 14, FIGURES 1, 2, 3 and the other end is mechanically held by a screw in a cylindrical bevel of gear 26, FIGURES 1, 2, in a similar manner to the way aforementioned latitudinal drive shaft 193 is mechanically held by aforementioned gear 22. Scanning stylus 90, FIGURES 1, 9 inserted in rear carriage block 88, FIGURES 1, 5, 9, 11 is guided by two directional drive slot 196, FIGURES 1, 2 and rear carriage direction reversing slots 198, FIGURES 1, 2 located on both ends of said latitudinal drive shaft 194, permitting latitudinal reciprocating motion of the rear carriage assembly 42, FIGURE 1, when driven by aforementioned gear 26 mechanically coupled to aforementioned gears 25, 24, 23, and 22 which in turn are driven by aforementioned scan motor 184.

Simultaneous longitudinal and latitudinal motion of the head transport assembly 121, FIGURE 1, causing said head transport assembly 121 to follow a zig-zag or oscillatory path on the record-reproduce record is attained through the mechanical coupling and meshing of the aforementioned longitudinal drive mechanisms with that of the aforementioned latitudinal reciprocating drive mechanisms by directly coupling the two drive systems together through the meshing of the teeth of worm gear 29, FIGURES 1, 8 with the teeth of gear 30, FIGURES 1, 8. Reciprocating motion of the head transport assembly 121, FIGURE 1, is only caused when said transport assembly 121 has reached a point on the longitudinal drive shaft 173, FIGURES 1, 4, 5, 11 where scanning stylus 125, FIGURES 1, 12 riding in two directional drive slot 181, FIGURES 4, 5, is driven into reverse direction slot 182, FIGURES 4, 5 causing the head transport assembly 121, FIGURE 1 to reverse its direction of motion at the end of the complete scan cycle, notwithstanding the fact that the reposition motor 185, FIGURES 1, 5, 17 has at that point been electrically energized, and has continued to drive the longitudinal shaft 173, FIGURES 1, 4, 5, 11 in the same direction as the scan motor 184, FIGURES 1, 2, 3, 17 has heretofore driven said shaft 173, and that said scan motor 184 is now deenergized, the latitudinal motion of aforementioned head transport assembly 121 stopped, by virtue of electrical and mechanical action of control circuit figure 17 described below, causing the deenergizing of said scan motor 184, and the energizing of the electromechanical clutch assembly 109, FIGURE 4, thus decoupling the aforementioned latitudinal drive mechanisms from the longitudinal drive shaft 173 through the disengaging of gear clutch 179, FIGURE 4 from gear clutch 174, FIGURE 4, and the energizing of the reposition motor 185, FIGURES 1, 5, 17 which continues to drive the aforementioned longitudinal drive shaft 173 until the aforementioned head transport assembly 121 is repositioned to its starting position on the record so that the record-reproduce cycle is capable of being repeated.

The recording medium herein referred to as the record 237, FIGURES 1, 16, 19, 20, 22 is made of a plastic and coated with magnetic material such as an oxide of iron or ferrous composition when utilizing a record-reproduce head 124, FIGURES 11, 13, 18 with a magnetic gap 171, FIGURE 13, for recording and reproducing of sound on said record 237. Recorded sound on the said record 237 is made by recording trace 240, FIGURE 16 which depicts the zig-zag scanning pattern produced by the head transport assembly 121, FIGURE 1. When the recording medium herein referred to as the record is made of a plastic material and used as the material on which sound is recorded and then played back, said record-reproduce head 124 with a steel, diamond, sapphire or ruby engraving stylus 172, FIGURE 14 is used as a sound recording or sound pick-up device, and recording trace 240, FIGURE 16 represents the recorded or reproduced sound on said record 237, and depicts the zig-zag scanning pattern produced by the head transport assembly 121, FIGURE 1.

Record 237, FIGURES 1, 16, 19, 20, 22 has groove 239, FIGURES 16, 19, 20 into which a photographic slide or a positive photographic print 238, FIGURES 1, 19, 20, may be inserted, said slide or print 238, becoming an integral part of and working in combination with the recorded sound on said record 237, so that at the same time the said slide or print 238 is optically projected, sound previously recorded on said record 237 may be simultaneously played back.

The transport 217, FIGURES 1, 15, 19, 20, 22 has record retaining groove 218, FIGURES 1, 15 into which record 237, FIGURES 1, 16, 19, 20, 22 in combination with slide or photograph 238, FIGURES 1, 19, 20 is inserted and retained, and said transport 217 is transported into transport channel 228, FIGURES 1, 15, edge 164, FIGURE 15 of said transport channel 228 riding in groove 219, FIGURES 1, 15, and stop 231, FIGURE 1, of said transport 217 riding in slot 230, FIGURES 1, 15, said stop 231 holding said transport 217 in said transport channel 228 at the time when aforementioned record 237 in combination with aforementioned slide or photograph 238 is inserted in aforemenitoned groove 218 of said transport 217. Transport channel 228, FIGURES 1, 15 is mechanically fastened to base 1, FIGURES 1, 2, 3, 6, 19, 20, 21 by screw 229, FIGURE 15 extending through a tapped hole in said base 1. Transport 217, FIGURES 1, 15, 19, 20, 22 is injected into transport channel 228, FIGURES 1, 15 by the compressing of spring 220, FIGURE 15 located in hole 221, FIGURE 15 of said transport 217 against brass cylinder 222, FIGURE 15, partially located in hole 221, FIGURE 15 and partially external to said transport 217, covered by transport channel 228, FIGURES 1, 15, which cylinder 222 is fitted and moves freely on rod 223, FIGURE 15, compressing spring 224, FIGURE 15 which is fitted on said rod 223. Said rod 223 is mounted in a hole or otherwise mechanically held by bracket 225, FIGURE 15 which is mechanically held in place and screwed into plate 1, FIGURES 1, 2 ,3, 6, 19, 20, 21 by means of screws 226 and 227, FIGURE 15. Transport 217, FIGURES 1, 15, 19, 20, 22 is held in place after injection into transport channel 228, FIGURES 1, 15 by means of tip of transport ejector 233, FIGURES 1, 22 cooperating with rib 232, FIGURES 1, 22 which due to the combination of spring 235, FIGURE 1 located over spring mount 234, FIGURE 1 and spring stop 236, FIGURE 1, normally causes pressure to be exerted by said tip of transport ejector 233 against said rib 232. When transport 217, FIGURES 1, 15, 19, 20, 22 retaining record 237, FIGURES 1, 16, 19, 20, 22 in combination with slide or photograph 238, FIGURES 1, 19, 20 is injected completely into its proper position, one edge of said record 237 in combination with said slide or photograph 238, are perfectly aligned with back stops 242 and 243, FIGURE 1, and said slide 238 is perfectly aligned with hole in base plate 241, FIGURES 1, 19, 21 so that when optical assembly 246, FIGURES 19, 20, 21 is mounted in place and aligned with said hole in base plate 241 and light reflector 249, FIGURE 19 containing projection lamp 245, FIGURES 17, 19, 20 illuminate and pass through photographic slide 238, FIGURES 1, 19, 20, said photographic slide may be optically projected by optical assembly 246, FIGURES 19, 20, 21. Ejection of transport 217, FIGURES 1, 15, 19, 20, 22 retaining record 237, FIGURES 1, 16, 19, 20, 22 in combination with slide 238, FIGURES 1, 19, 20 is accomplished by means of pressing on transport ejector 233, FIGURES 1, 22 so that the tip of said ejector 233 clears the rib 232, FIGURES 1, 22 permitting compressed springs 220 and 226, FIGURE 15 to expand and push against cylinder 222, FIGURE 15 which in turn pushes against spring 220, FIGURE 15, which in turn causes transport 217, FIGURES 1, 15, 19, 20, 22 to be ejected.

When a photographic transparency or slide 238, FIGURES 1, 19, is used in combination with and made an integral part of record 237, FIGURES 1, 16, 19, 22, FIGURE 19 represents the physical and structural relationship of the parts. Transport 217, FIGURES 1, 15, 19, 22 retaining the combined slide 238 and record 237 transports said combination of slide and record until back stops 242 and 243, FIGURE 1 are reached, at which point said slide 238 is positioned directly over hole in base plate 241, FIGURES 1, 19, 21. Light reflector 249, FIGURE 19 retaining and making electrical and mechanical contact with projector lamp 245, FIGURES 17, 19 is located and mounted to the underside of plate 1, FIGURES 1, 2, 3, 6, 19, 21 so that when said projector lamp is illuminated, light may pass through slide 238, be impinged on 45 degree angle positioned mirror 248, FIGURE 19, reflected by said mirror 248 in a horizontal beam of light through lens assembly 247, FIGURES 19, 21, 22 of optical assembly 246, FIGURES 19, 21 on to a projection screen. Said optical assembly 246 is welded or otherwise affixed to bracket 244, FIGURES 19, 21, which bracket 244 is in turn bolted to bracket 15, FIGURES 1, 6, 19, 21 in such a manner that clearance for record 237, FIGURES 1, 16, 19, 22 is provided when said record 237 is injected or ejected by aforementioned transport 217.

When a photographic positive or print 238, FIGURES 1, 20 is used in combination with and made an integral part of record 237, FIGURES 1, 16, 20, 22, FIGURE 20 represents the physical and structural relationship of the parts. Transport 217, FIGURES 1, 15, 20, 22 retaining the said combined photograph 238 and record 237, transports said combination of photograph and record until back stops 242 and 243, FIGURE 1 are reached, at which point said photograph 238 is positioned directly under the bottom opening of optical assembly 246, FIGURES 20, 21, so that when light reflector 250, FIGURE 20 retaining and making electrical and mechanical contact with projector lamp 245, FIGURES 17, 20 is illuminated, light reflected from reflector 250 and mirrors 251, 252, 253, FIGURE 20 will illuminate and reflect from the positive photographic image 238, FIGURES 1, 20, be impinged on 45 degree angle positioned mirror 248, FIGURE 20, reflected by said mirror 248 in a horizontal beam of light through lens assembly 247, FIGURES 20, 21, 22 of optical assembly 246, FIGURES 20, 21, on to a projection screen. Said optical assembly 246 is welded or otherwise affixed to bracket 244, FIGURES 20, 21, which bracket 244 is in turn bolted to bracket 15, FIGURES 1, 6, 20, 21 in such a manner that clearance for record 237, FIGURES 1, 16, 20, 22 is provided when said record 237 is injected or ejected by aforementioned transport 217.

Recording or reproducing sound is accomplished by the record-reproduce electronic circuit in the following way: alternating current power is applied from the hot side of alternating current power terminal 259 and common return 260 of alternating current input power means 254, FIGURES 17, 18, 21, 22 into switch 255, FIGURES 17, 18, 21, 22. Said terminal 259 is connected to switch blade 263, FIGURES 17, 18 which makes contact and cooperates with switch contact 262, FIGURES 17, 18 to apply power to direct current power supply 258, FIGURES 17, 18, 21, which is connected to and applies direct current power from power means 261, FIGURES 17, 18 and common return 260, FIGURES 17, 18, 21, 22 to record-reproduce amplifier 302, FIGURES 18, 21 and radio frequency modulator 301, FIGURES 18, 21 used when recording with a magnetic type head on magnetic recording material. In the recording position the said modulator 301 is electrically connected between said modulator 301 and said common return 260 to record-reproduce head 124, FIGURES 11, 13, 14, 18 via record-reproduce switch 256, FIGURES 18, 21, 22 by virtue of switch blade 304, FIGURE 18 cooperating and makes electrical contact with switch contact 303, FIGURE 18, causing a D.C. current to flow through and a bias voltage to be impressed across the winding of said magnetic head 124 between wire input lead 170, FIGURES 11, 13, 14, 18 and said common return 260. Electrical connection is also made between said head input wire lead 170 and said common return 260 to output of aforementioned amplifier 302 by virtue of an electrical connection between output of said amplifier 302 and switch blade 310, FIGURE 18 which makes electrical contact and cooperates with switch contact 309, FIGURE 18 which in turn is electrically connected to aforementioned lead 170 of record-reproduce head 124. Sound is impressed on the record 237, FIGURES 1, 16, 19, 20, 22 when microphone 300, FIGURES 18, 22 is plugged into jack 299, FIGURES 18, 22 causing microphone plug to cooperate with said jack and thus make electrical contact with switch contact 306, FIGURE 18 of switch 256, FIG- URES 18, 21, 22 which cooperates with switch blade 307, FIGURE 18 of said switch 256 thus establishing an electrical connection, and said switch blade 307 is electrically connected to the input terminal of aforementioned record-reproduce amplifier 302 thus enabling the recording of sound to take place. Sound is reproduced by the record-reproduce amplifier, when record-reproduce head 124, FIGURES 11, 13, 14, 18 is caused to scan aforementioned record 237, said head 124 acting as a sound pick-up device. Under reproduce conditions aforementioned modulator 301 is disconnected from the reproduce circuit by virtue of aforementioned switch 256 assuming the reproduce position in which case switch blade 304, FIGURE 18 cooperates and makes electrical connection with switch terminal 305, FIGURE 18, said switch terminal 305 also being electrically connected to switch terminal 308, FIGURE 18 and switch blade 307, FIGURE 18 cooperates with said switch terminal 308, providing an electrical reproduce signal to the input terminals of said record-reproduce amplifier 302, FIGURES 18, 21. Output of record-reproduce amplifier 302 is electrically connected to switch blade terminal 310, FIGURE 18 which cooperates and establishes electrical contact with switch terminal 311, FIGURE 18, said switch terminal 311 being electrically connected to the signal lead input of loud speaker 312, FIGURES 18, 21 thus providing the electrical paths required for reproduction of sound. All terminals 260 on FIGURE 18 are common return paths and are electrically connected together at all times providing a common return for both the record-reproduce signal and the alternating and direct current power. When a stylus-type of record-reproduce head 124 is used to engrave sound on a plastic record instead of a magnetic type head as heretofore discussed, aforementioned modulator 301 is removed from the record-reproduce operation and hence the electrical connections between aforementioned power supply 258 and aforementioned modulator 301 as well as the electrical connection between aforementioned modulator 301 and aforementioned switch contact 303 are all removed.

The control circuit of which a schematic diagram is shown in FIGURE 17 is specified as follows:

Alternating current power supplied from power means terminal 259 of input alternating current power means 254, FIGURES 17, 18, 21, 22 is electrically connected to contact 264, FIGURE 17 of reflector lamp switch 257, FIGURES 17, 21, 22. Switch blade 265, FIGURE 17 of said reflector lamp switch 257 is electrically connected to one side of reflector lamp 245, FIGURES 17, 19, 20, the other side of said reflector lamp 245 being electrically connected to common ground return 260 of input alternating current power means 254, FIGURES 17, 18, 21, 22. When switch blade 265, FIGURE 17 is moved so that it makes mechanical contact with said contact 264 so that said contact 264 and said switch blade 265 cooperate with each other to make an electrical connection, said reflector lamp 245 is electrically energized and illuminates the aforementioned photographic slide or print 238 inserted in combination with the aforementioned sound record 237 into the aforementioned transport 217 which situates the said combined slide and record so that said slide may be projected via the aforementioned optical assembly 246 on to a screen external to the projector. Alternating current power is supplied from power means terminal 259 and 260 of input alternating current power means 254, FIGURES 17, 18, 21, 22. Said terminal 259 is electrically connected to contact 262, FIGURES 17, 18 of power switch 255, FIGURES 17, 18, 21, 22. Switch blade 263, FIGURES 17, 18 of said power switch 255 is electrically connected to input of direct current power supply 258, FIGURES 17, 18 21 and the other side of said direct current power supply 258 is electrically connected to aforementioned common ground return 260. Alternating current power is also provided to contact 290, FIGURE 17 of return-motor-hold-relay 283, FIGURES 17, 21 by electrically connecting said contact 290 with aforementioned switch blade 263. When said switch blade 263 is moved so that it cooperates with aforementioned contact 262 to provide an electrical connection between said contact 262 and said switch blade 263, direct current power supply 258, FIGURES 17, 18, 21 will be electrically energized causing direct current power to be available between direct current output terminal 261, FIGURES 17, 18 and aforementioned common ground return 260, and alternating current power will be made available between aforementioned switch blade 263 and aforementioned common ground return 260.

Direct current power is supplied from aforementioned direct current output terminal 261 by means of an electrical connection between said terminal 261 and contact 267, FIGURE 17 of push-to-scan-button 266, FIGURES 17, 21, 22, relay contacts 273 and 275, FIGURE 17 of scan-hold-relay 270, FIGURES 17, 21, contact 288, FIGURE 17 of return-motor-hold-relay 283, FIGURES 1, 11, 12, 17, contact lead 134, FIGURES 1, 11, 12, 17, beryllium-copper contact spring 133, FIGURES 1, 11, 2, 17, contact lead 141, FIGURES 1, 11, 12, beryllium-copper contact spring 140, FIGURES 1, 11, 12, 17, and contact 280, FIGURE 17 of push-to-recycle-button 279, FIGURES 17, 21, 22. Electrical connections exist between contact 268, FIGURE 17, scan-hold-coil 271, FIGURE 17 of scan-hold-relay 270, FIGURES 17, 21, one side of scan-on-lamp 276, FIGURES 17, 21, 22, and contact 272, FIGURE 17 of said scan-hold-relay 270. Electrical connections exist between said scan-hold-coil 271, the other side of said scan-on-lamp 276, and contact 285, FIGURE 17 of reposition-motor-hold-relay 283, FIGURES 17, 18 making mechanical and electrical connection with cooperating contact 286, FIGURE 17 and electrically connecting to aforementioned common ground return 269. When moving contactor 269, FIGURE 17 of push-to-scan-button 266, FIGURES 17, 21, 22 is momentarily connected to and caused to cooperate with contacts 267 and 268, FIGURE 17 of said push-to-scan-button 266, electrical current flows through aforementioned scan-hold-coil 271 and aforementioned scan-on-lamp 276 causing said scan-hold-coil 271 to be electrically energized and said scan-on-lamp 276 to light, scan-hold-relay 270, FIGURES 17, 21 to be activated causing cooperation between contacts 272 and 273, FIGURE 17, and cooperation between contacts 274, and 275, FIGURE 17, and causing said scan-hold-coil 271 to be electrically held in an energized state by virtue of said contacts 272 and 273 supplying power to scan-hold-coil 271. Scan-motor 184, FIGURES 1, 2, 3, 17 being electrically energized and started by virtue of also being electrically connected to aforementioned common-ground-return 260, causes the head transport assembly 121, FIGURE 1, positioned adjacent to the front carriage assembly 41, FIGURE 1 to be moved in a zig-zag or oscillatory pattern across record 237, FIGURES 1, 16, 19, 20, 22. Contact 95, FIGURES 1, 9, 17 is electrically connected to contact lead 120, FIGURES 1, 17, which is electrically connected to contact 281, FIGURE 17 of push-to-recycle-button 279, FIGURES 17, 21, 22, which is electrically connected to reposition-motor-hold-coil 284, FIGURE 17 of reposition-motor-hold-relay 283, FIGURES 17, 21 and contact 287, FIGURE 17 of said reposition-motor-hold-relay 283 to wire lead 114, FIGURES 4, 17 of solenoid coil 110, FIGURES 4, 17 to one side of recycle-on-lamp 291, FIGURES 17, 21, 22; the other side of said recycle-on-lamp 291 is connected in parallel with the other side of aforementioned reposition-motor-hold-coil 284, which is electrically connected to wire lead 115, FIGURES 4, 17 of solenoid coil 110, FIGURES 4, 17, which is electrically connected to contact 292, FIGURE 17 of reposition-motor-off-relay 277, FIGURES 17, 21, and contact 293, FIGURE 17 of said reposition-motor-off-relay 277 making electrical contact and cooperating with said contact 292, is electrically connected to aforementioned common ground return 260. Contact 290, FIGURE 17 of reposition-motor-hold-relay 283, FIGURES 17, 21 being electrically connected to switch blade 263 of power switch 255, FIGURES 17, 18, 21, 22 and contact 289, FIGURE 17 of said reposition-motor-hold-relay 283 being electrically connected to one side of reposition-motor 185, FIGURES 1, 5, 17 while the other side of said reposition-motor 185 is electrically connected to aforementioned common ground return 260. Contact 57, FIGURES 1, 10, 17 is electrically connected to contact lead 58, FIGURES 1, 17 which is electrically connected to one side of reposition-motor-off-coil, FIGURE 17 of reposition-motor-off-relay, FIGURES 17, 21 while the other side of said reposition-motor-off-coil 278 is electrically connected to aforementioned common ground return 260.

When it is desired to stop the scanning action prior to completion of travel of aforementioned head transport assembly 121, FIGURE 1 to the end of its scan position adjacent to the rear carriage assembly 42, FIGURE 1, moving contact 282, FIGURE 17 of push-to-recycle-button 279, FIGURES 17, 21, 22 is momentarily depressed so that said moving contact 282 momentarily cooperates with aforementioned contacts 280 and 281, FIGURE 17 causing momentary electrical contact to be made between said contacts 280, 281 and 282 and thereby causing reposition-motor-hold-coil 284, FIGURE 17 to be electrically energized and held so energized by virtue of holding contact pair 287 and 288, FIGURE 17 cooperating with each other and reposition-motor 185, FIGURES 1, 5, 17 be electrically energized through cooperation of contact pair 289 and 290, FIGURE 17 which apply alternating current power to said reposition-motor 185; or when end of scan has been normally reached by virtue of motion of the scanner transporting the aforementioned head transport assembly 121 in a zig-zag or oscillatory pattern so that said head transport assembly 121 has reached a position adjacent to the rear carriage assembly 42, FIGURE 1, beryllium-copper spring contact 133, FIGURES 1, 11, 12, 17 cooperating and making momentary electrical connection with contact 95, FIGURES 1, 9, 17 to electrically energize the reposition-motor-hold-coil 284, FIGURE 17 causing contacts 287 and 288, FIGURE 17 to cooperate with each other and hold said reposition-motor-hold-coil in an energized state, at the same time as solenoid coil 110, FIGURES 4, 17 and recycle-on-lamp 291, FIGURES 17, 21, 22 are electrically energized lighting said recycle-on-lamp 291 and causing the electromechanical clutch assembly 109 to disengage freeing the longitudinal drive shaft 173, FIGURES 1, 4, 5, 11 from the aforementioned latitudinal drive mechanism. At the same time, cooperating contacts 285 and 286, FIGURE 17 are opened due to the electromechanical action of aforementioned reposition-motor-hold-relay 283, thus deenergizing scan-hold-coil 271, FIGURE 17, and the deenergizing of scan-on-lamp 276, FIGURES 17, 21, 22, opening previously cooperating contacts 272 and 273, FIGURE 17, opening previously cooperating contacts 274 and 275, FIGURE 17 thus causing scan motor 184 to be deenergized and to stop, while contacts 289 and 290, FIGURE 17 cooperate with each other causing alternating current power to be applied to reposition motor 185, FIGURES 1, 5, 17, said reposition motor 185 driving the head transport assembly 121, FIGURE 1 quickly to a position adjacent to the front carriage assembly 41, FIGURE 1, while at the time of start of the reposition motor 185, the motion of the said head transport assembly 121 driven by the aforementioned longitudinal drive shaft 173 coupled to said reposition motor 185 causes the separation of the aforementioned momentarily cooperating contact 95, FIGURES 1, 9, 17 with contact 133, FIGURES 1, 11, 12, 17, so that now contact 57, FIGURES 1, 10, 17 is enabled to make mechanical and electrical connection and cooperate with beryllium contact spring 140, FIGURES 1, 11, 12, 17 causing the reposition-motor-off-coil 278, FIGURE 17 of the reposition-motor-off-relay 277, FIGURES 17, 21 to be electrically energized thus opening cooperating contacts 292 and 293, FIGURE 17 of said reposition-motor-off-relay 277, FIGURE 17, deenergizing aforementioned reposition-motor-hold-coil 284, deenergizing aforementioned electromechanical clutch assembly 110, deenergizing aforementioned recycle-on-lamp 291, opening of cooperating contacts 287 and 288, FIGURE 17, opening of cooperating contacts 289 and 290, FIGURE 17 so that alternating current power is removed from the reposition motor 185, FIGURES 1, 5, 17 thus stopping said reposition motor 185, and also causing contacts 285 and 286, FIGURE 17 to be moved so that they again cooperate with each other thus enabling the scan recycle to be repeated the moment moving contactor 269, FIGURE 17 is pushed so that it cooperates with contacts 267 and 268, FIGURE 17 of push-to-scan-button 266, FIGURES 17, 21, 22. The moment the scan cycle begins again the aforementioneed head transport assembly 121 begins to move away from the aforementioned front carriage assembly 41, thusly breaking the aforementioned cooperating contacts 57 and 140 from each other and restoring cooperation between aforementioned contacts 292 and 293 due to the electrical deenergizing of aforementioned reposition-motor-off-coil 278 thusly restoring the capability of the reposition action when performed manually by virtue of operating aforementioned push-to-recycle-button 279, or automatically by virtue of aforementioned momentary cooperating contacts 95 and 133 making electrical contact with each other at the completion of the recording cycle when the aforementioned head transport assembly 121 reaches a position adjacent to the aforementioned rear carriage assembly 42.

Parts used in the aforementioned record-reproduce circuit and the aforementioned control circuit are mounted on base 1, FIGURES 1, 2, 3, 6, 19, 20, 21. Baffle panel 298 is welded or otherwise affixed to chassis 297, FIGURE 21, which is in turn welded or otherwise affixed to aforementioned base 1. Loud speaker 312, FIGURES 18, 21, is bolted or otherwise affixed to said baffle panel 298, while aforementioned direct current power supply 258, aforementioned radio frequency modulator 301, aforementioned record-reproduce amplifier 302, aforementioned scan-hold-relay 270, aforementioned reposition-motor-off-relay 277, aforementioned reposition-motor-hold-relay, and aforementioned input alternating current power means 254 are all bolted or otherwise affixed to chassis 297, FIGURE 21. Insulating mounting strip 294, FIGURES 21, 22, is supported by studs 295, 296, FIGURE 21, which are welded or otherwise affixed to aforementioned base 1. Said insulated mounting strip 294, FIGURES 21, 22, has mounted thereon aforementioned scan-on-lamp 276, aforementioned recycle-on-lamp 291, aforementioned microphone jack 299, aforementioned power switch 255, aforementioned record-reproduce switch 256, aforementioned reflector lamp switch 257, aforementioned push-to-recycle-button 279, and aforementioned push-to-scan-button 266. Cover 313, FIGURE 22, has louvre slots 314, FIGURE 22, for ventilating and escape source for heat generated by aforementioned projection lamp and electrical and electronic circuitry. Said cover 313 is fitted over projector and bolted by self-tapping bolts projecting through holes in said cover 313 into holes in feet mounted under said base 1. Screw 315 is tapped into hole 5 of foot 2, FIGURES 1, 21, 22, screw 316 is tapped into hole 6 of foot 3, FIGURES 1, 21, 22, and similarly two other screws are fitted into hole 8 of foot 7, FIGURE 6, as well as into a similar hole in foot 4, FIGURES 1, 19, 20, 21, 22, thus securing said cover 313 to aforementioned base 1.

Slide and photographic projection machines, or sound record-reproduce machines in themselves have been invented and are not claimed broadly; however the features and principles underlying the invention described above in connection with specific exemplifications will suggest to those skilled in the art many other modifications thereof.

I claim:

1. In a means for optically projecting visual information and reproducing sound from a stationary slide containing said visual information and a sound track, the combination of a sound reproducing head, means supporting said head for translation along first and second mutually orthogonal axes, a first drive shaft parallel said first axis and having oppositely pitched threads in threaded engagement with said head supporting means so that said head traverses said shaft in first one direction and then the opposite direction as said shaft is rotated in a predetermined direction, a scan motor coupled to said first drive shaft for rotating same in said predetermined direction, a second drive shaft parallel said second axis and having oppositely pitched threads in threaded engagement with said head supporting means so that said head traverses said shaft in first one direction and then the opposite direction as said shaft is rotated in a predetermined direction, and means for coupling said first drive shaft to said second drive shaft so that said shafts are continuously driven in said respective predetermined direction by said scan motor.

2. In the apparatus described in claim 1 wherein said means for coupling said first drive shaft to said second drive shaft reduces the rotational velocity of said second drive shaft relative said first drive shaft so that said head oscillates a plural number of times along said first axis while traversing the length of said second drive shaft.

3. The apparatus described in claim 2 wherein said means for coupling said first drive shaft to said second drive shaft includes a worm gear driven by said first drive shaft in engagement with a gear coupled to said second drive shaft.

4. In the apparatus described in claim 1, first switch means actuated by said head upon traversal of said second drive shaft in said first one direction and means responsively coupled to said switch means for rapidly repositioning said head to a predetermined start position.

5. In the apparatus described in claim 4, a reposition motor coupled to said second drive shaft and responsive to said first switch means so that said motor is energized when said head has traversed said second drive shaft in said one direction.

6. In the apparatus described in claim 4, electromagnetic clutch means responsive to said first switch means for uncoupling said second drive shaft from said first drive shaft when said head has traversed said second drive shaft in said one direction.

7. In the apparatus of claim 4, means connecting said scan motor to said first switch means so that said scan motor is disconnected upon actuation of said switch means.

8. In the apparatus of claim 5, second switch means actuated by said head when it traverses said second drive shaft in said opposite direction to a predetermined start position, said switch means being coupled to said reposition motor so that said motor is de-energized upon actuation of said means.

9. In the apparatus of claim 4, a push-to-recycle manual switch electrically connected in parallel with said first switch means so that the head is automatically repositioned to said predetermined start position upon actuation of said manual switch.

10. In the apparatus of claim 1, a reposition motor coupled to said second drive shaft for rotating same in said predetermined direction.

11. In the apparatus of claim 10 wherein said second drive shaft comprises an integral portion of said reposition motor armature.

12. In a means for optically projecting visual information and reproducing sound from a stationary slide containing said visual information and a sound track, the combination of a sound reproducing head, means supporting said head for translation along first and second mutually orthogonal axes, first means coupled to said head support means for providing an oscillatory translation of said head along said first axis, second means coupled to said head support means and selectively coupled to said first means for translating said head along said second axis, and head reposition means for returning said head to a predetermined start position including a reposition drive means coupled to said second means and means for uncoupling said second means from said first means.

13. In a means for optically projecting visual information and reproducing sound from a unitary stationary slide containing said visual information and a sound track following a generally sinusoidal path, the combination of a sound reproducing head, first means for oscillating said head along a first axis, second means for linearly translating said head along a second axis orthogonal to said first axis, and scan drive means synchronously coupled to said first and second means for continuously translating the head along said first and second axes, means for uncoupling said scan drive means from said second means and reposition drive means selectively coupled to said second means for returning said head to a predetermined start position.

14. In a means for optically projecting visual information and reproducing sound on a stationary slide containing said visual information and a sound track, the combination of a base support member, a front carriage assembly and a rear carriage assembly maintained in spaced-apart relationship, means coupled to said first front and rear carriage assemblies for providing oscillatory translation of said assemblies along respective axes parallel to a first axis, a sound reproducing head supported by said front and rear carriage assemblies for translation along a second axis orthogonal to said first axis, and means supported by said front and rear carriage assemblies for translating said head along said second axis at a slower velocity than said oscillatory translation of said front and rear carriage assemblies.

15. In a means for optically projecting visual information and reproducing sound from a stationary slide containing said visual information and a sound track, the combination of motor-driven apparatus including first and second gear synchronized drive shafts having oppositely pitched helical slots therein, a front carriage assembly and a rear carriage assembly, each assembly including a stylus riding in the slots of said first and second shafts respectively, a motor coupled to said gear synchronized first and second drive shafts for providing continuous oscillatory translation of said carriage assemblies, a third drive shaft rotatably mounted between and moving with said front and rear carriage assemblies, speed reducing gears mounted on one of said driven carriage assemblies for coupling said first drive shaft to said third drive shaft, a head transport assembly including a stylus riding in the slot of said third drive shaft so that when said gear-synchronized carriage assemblies move in an oscillatory manner, said head transport assembly is traversed along the longitudinal axis of said third drive shaft simultaneously with motion of the first and second drive shafts producing a zig-zag scanning motion of said transport assembly, and a sound reproducing head suspended from said head transport assembly for traversing said stationary slide.

16. In the apparatus of claim 15 a long spline gear parallel said first and second drive shafts and translated in accordance with said front and rear carriage assemblies and rotatably driven in accordance with said first and second drive shafts, and a worm gear formed at one end of said spline gear and enmeshed with a spear gear rotatably mounted on one of said carriage assemblies for rotation on an axis parallel to said third axis, said spear gear being coupled to said speed reducing gears.

References Cited by the Examiner

UNITED STATES PATENTS

| | | | |
|---|---|---|---|
| 2,925,753 | 2/1960 | Schwartz et al. | 88—28 |
| 2,961,922 | 11/1960 | Schwartz et al. | 88—28 |
| 3,057,255 | 10/1962 | Bregman | 88—28 |
| 3,063,338 | 11/1962 | Bregman | 88—28 |
| 3,070,374 | 12/1962 | Nakamatsu | 274—4 |
| 3,122,053 | 2/1964 | Dimitracopoulos et al. | 88—28 |
| 3,122,054 | 2/1964 | Dimitracopoulos et al. | 88—28 |

OTHER REFERENCES

Reinert: 1,045,122, German application, published November 27, 1958.

Lorenz: German application, 1,078,365, published March 24, 1960, 179–100.2T.

NORTON ANSHER, *Primary Examiner.*

WILLIAM MISIEK, *Examiner.*